United States Patent Office 2,910,915
Patented Nov. 3, 1959

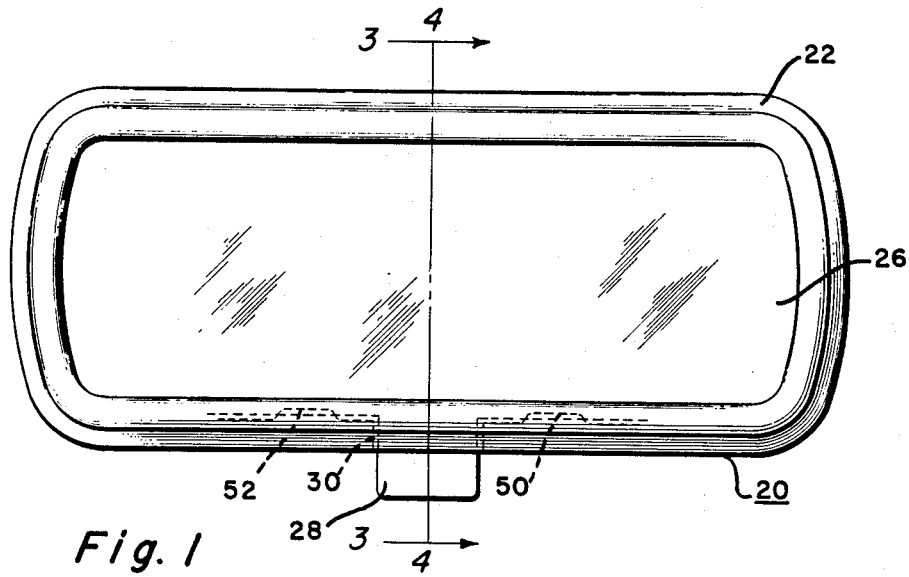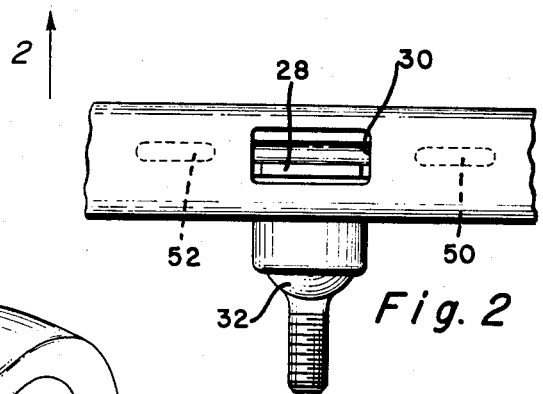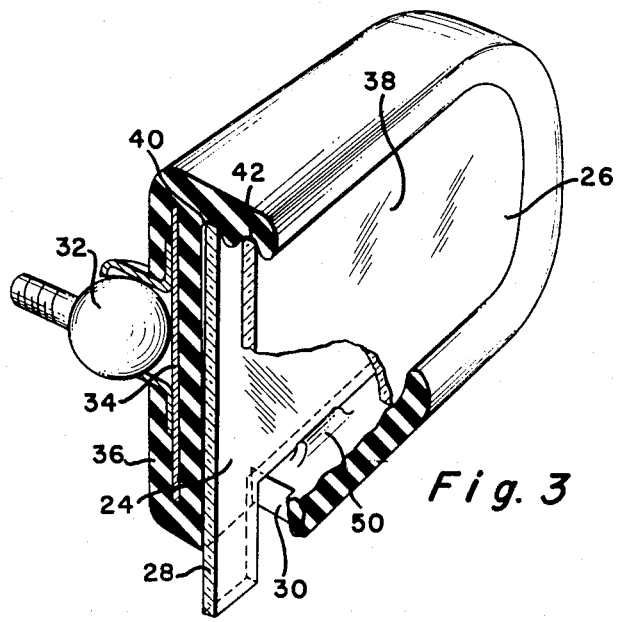

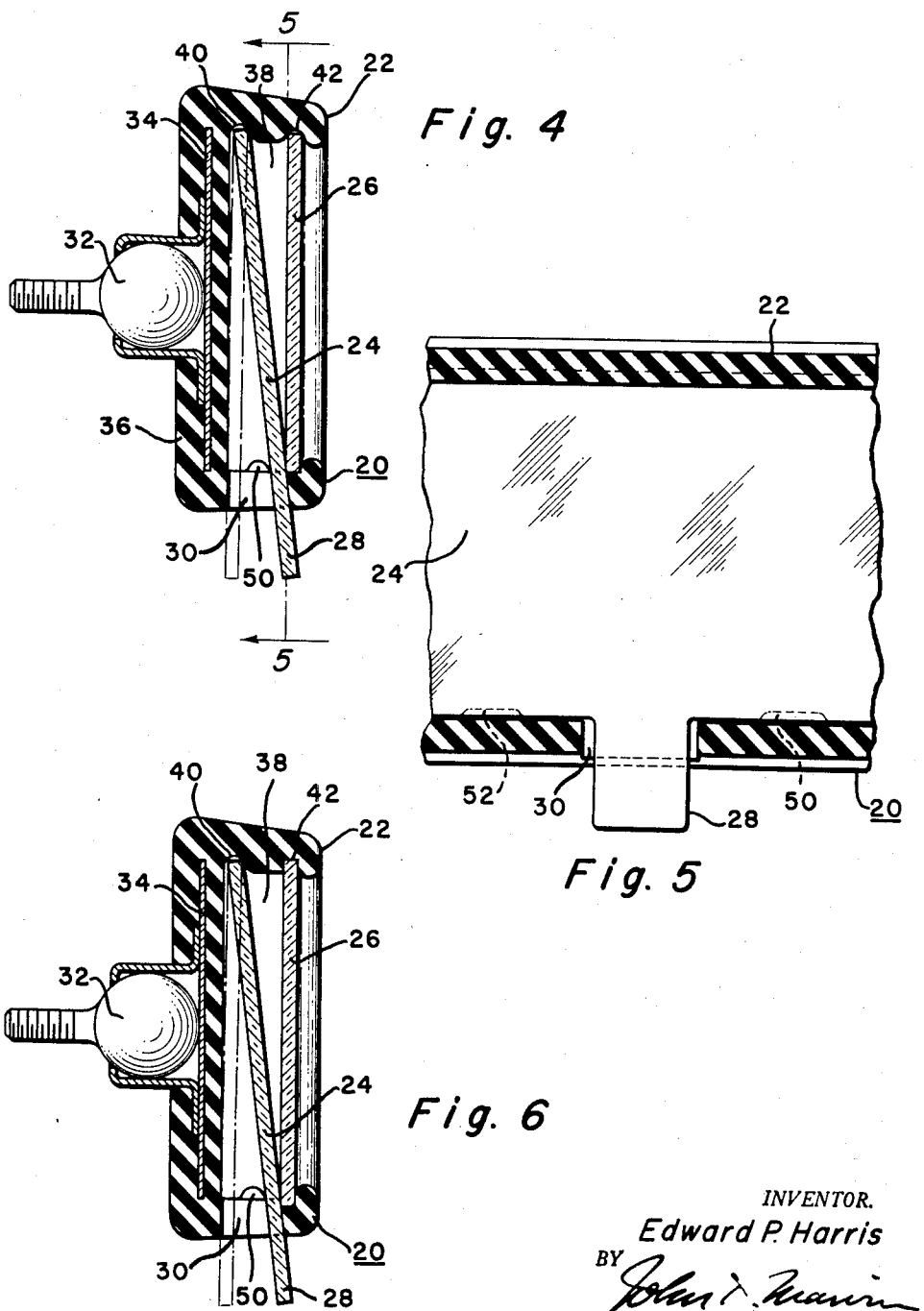

2,910,915

SAFETY REAR VISION MIRROR

Edward P. Harris, Dayton, Ohio, assignor to General Motors Corporation, Detroit, Mich., a corporation of Delaware Application September 13, 1956, Serial No. 609,632

2 Claims. (Cl. 88—77)

This invention relates to mirrors and is particularly concerned with safety rear vision mirrors for use in vehicles.

It is the main object of the invention to provide a safety rear vision mirror comprising a shatter-proof mirror enclosed in a resilient case and including a no-glare shield, said mirror being shiftable to reduce the glare thereon, said safety mirror assembly including means for holding the shiftable portion thereof in one of two positions.

In carrying out the above object, it is a further object to use a portion of the resilient frame or case for the device as a means for holding the shiftable mirror in either one of its two positions.

A still further object of the invention is to provide a safety no-glare rear vision mirror with a resilient casing wherein the casing is made of an elastomeric material such as rubber, synthetic elastomers, resilient foams suitably covered with an impervious skin such as latex foams, polyisocyanate foams and the like and wherein the mirror is preferably made of a shatter-proof plastic material and the no-glare shield is made of the same material, said mirror being shiftable to two positions for reducing glare thereon and being held in either one of said two positions by a portion of the elastomeric casing.

In carrying out the above object, it is a still further object to provide a stiffening member to which a mounting means may be applied, said stiffening member being carried within and preferably bonded to the elastomeric case for the mirror.

Further objects and advantages of the present invention will be apparent from the following description, reference being had to the accompanying drawings wherein preferred embodiments of the present invention are clearly shown.

In the drawings:

Figure 1 is a plan view of the mirror as described herein.

Figure 2 is a fragmentary view of a mirror taken in the direction of the arrow marked 2 in Figure 1.

Figure 3 is a partial section in perspective taken substantially on line 3—3 of Figure 1.

Figure 4 is a section taken on line 4—4 of Figure 1.

Figure 5 is a section taken on line 5—5 of Figure 4.

Figure 6 is a section of a modified structure taken on line 4—4 of Figure 1, wherein the no-glare shield is shown in dotted lines in one of its positions.

Present day vehicular design places strong accent on safety. In automotive vehicles, padding and foam are used to a great extent to make the dashboard and cowl of the car resilient and efforts have been made to improve the resilience and impact absorbing qualities of the steering wheel, etc.

There have even been attempts made to provide rear vision mirrors which are of a shock absorbing nature so that the head of occupants of the vehicle are not seriously injured during an accident if thrown against the rear vision mirror. These past devices have fallen short of the mark since while they have, in some cases, provided a resilient rim for the mirror, they include glass in the mirror which is easily broken and shattered and which will cut the occupants of the car. Furthermore, in a safety rear vision mirror, it is highly desirable to have the no-glare feature whereby the driver may make mechanical adjustments to present a no-glare position when bright lights are present behind him to reduce the glare on the mirror. A no-glare mirror is well known in the art and one of such mirrors which has met with high favor is shown in Patent 2,469,207. In this structure, a mirror is provided which is tilted to different positions for reducing glare without eliminating the rear vision effect.

In Patent 2,420,259, another rear vision mirror of the no-glare type is shown wherein a protecting shield is used which is relatively tiltable with respect to the mirror. In this instance, the no-glare shield is thinly mirrored and acts as a reflecting medium in one position while, when it is juxtaposed with the main mirror, it augments the reflectivity of said mirror. In any event, by changing the relative positions of the shield and mirror, it is possible to reduce the glare.

The present invention is specifically directed to a rear vision mirror of the safety type wherein anti-glare or no-glare features are incorporated and wherein the mirrored portions are made from a shatter-proof material other than glass and wherein the casing is a rubber-like resilient material such as an elastomeric material either natural or synthetic. The mirror portions in the present instance are preferably made from polystyrene which is plated on one surface to provide a shatter-proof mirror. A method for plating polystyrene and other shatter-proof plastics is clearly shown in Patent 2,364,745.

Referring specifically, to the drawings, one form of my improved mirror is shown at 20 in Figure 1. This includes an elastomeric housing or case member 22 which supports a mirror 24 preferably formed from polystyrene and a no-glare plate or shield 26 also preferably made of polystyrene. The mirror portion 24 includes a downwardly extending tab, or handle, 28 which extends through an opening 30, or aperture, in the casing 22 for external manipulation. Referring to Figure 3, it will be seen that a ball joint mounting 32 is welded or otherwise secured to a metallic support plate 34 that is embedded in the rear portion 36 of the casing 22. Preferably, this reinforcing plate is of considerably less size but of the same general shape as the back 36 of the casing 22 and preferably the plate is bonded to the elastomeric material of the casing 22. This may be accomplished by placing the plate coated with a suitable cement in a mold. The plate may be electroplated to provide clean surfaces or may be otherwise suitably cleaned prior to its association with the elastomeric material which is then filled into the mold and around the plate and is vulcanized or cured in place to simultaneously bond the elastomeric material to the plate. It is to be understood that a bond is not entirely necessary although such a structure strengthens the mirror assembly and is preferred.

At the front portion of the casing 22 is a depression or open cavity 38 which includes, in one embodiment, a groove 40 extending around its inner periphery on at least three sides of the casing 22 and holds the mirror 24. A second parallelly disposed groove 42 is also provided spaced from the groove 40 and adjacent the outer edges of the cavity 38. The no-glare shield or pane 26 is held within the groove 42. Thus, when the mirror 24 is in the position shown in Figure 3, the mirror 24 and the shield 26 are parallel to one another and are held within the grooves 40 and 42, respectively, of the casing 22.

In the preferred embodiment, the grooves 40 and 42 extend on three sides only of the cavity 38, namely, the two ends and the upper sides as noted in Figure 3. The lower side of the cavity 38 includes two bumps, or projections, 50 and 52, which are spaced parallel to the edge of the cavity 38 and are positioned between the mirror 24 and the pane 26. These projections 50 and 52 being resilient can be distorted so that when the mirror 24 is tilted forwardly at the bottom thereof by pressure applied to the tab 28, the projections 50 and 52 are resiliently deformed so that the lower portion of the mirror passes thereover to a position as shown in Figure 4. In this position, the mirror 24 is held tilted and out of parallelism with respect to the pane 26, and the projections, due to their inherent resiliency, snap back to their original shape and position to hold the mirror in its tilted position.

In another embodiment of the invention, the groove 42 extends entirely around the cavity wall as noted in Figure 6 and the projections 50 and 52 are spaced therefrom. This added portion of the groove 42 is not generally necessary since the casing 22 holds the plate and mirror in assembled relation with no apparent difficulty.

In practice, the casing 22 is molded from any suitable elastomeric material such as natural rubber, rubbery butadiene styrene copolymers, rubbery butadiene acrylonitrile copolymers, synthetic resins of elastomeric character, polychloroprene, etc. The casing may also be formed from foamy material similar to that used in crash pads, for example, latex foam, synthetic latex foam or polyisocyanate foam wherein the foam may be semi-rigid to yield good shock absorbing characteristics or may be fully elastomeric. In all cases, with respect to the foam, a skin covering is preferred and on foams which have an open pore surface, this can be accomplished by spraying, or otherwise coating, the surface with a lacquer or suitable latex cement, etc. All of such modifications are well known in the art.

In principle, when the mirror is in the position shown in Figure 3, the driver peers through the pane 26 and sees the rear view directly on the mirror 24. At night, when the glare of lights, etc., tend to blind the driver, the mirror 24 is tilted as shown in Figure 4 whereupon direct reflection is not apparent but a reduced glare reflection is seen on the pane 26. In this manner, the direct reflection of the glare is thrown out of line of the driver's vision.

The ball joint 32, provided in this structure, permits the entire structure 20 to be tilted in any desired position and also provides means for securing the structure to a suitable fixture mounted on the top of the inner cowl or above the windshield or any other suitable position. It is apparent from this disclosure that I have provided a safety rear vision mirror which has no-glare features and which is inexpensive to fabricate and completely safe to use. No crtical manufacturing limits are necessary in order to produce the device and the casing may be molded in conventional molds with usual shop tolerances wherein due to the resilient nature of the casing which does not include any reinforcing means around the external periphery thereof, the pane and mirror are firmly and resiliently grasped and held in poistion without the need for maintaining critical dimensional tolerances on any of the parts thereof. The use of the projections 50 and 52 as a resilient latching means also provides a simple and effective structure completely operative without the use of expensive latches, catches, etc.

While the embodiments of the present invention as herein disclosed constitute preferred forms, it is to be understood that other forms might be adopted.

What is claimed is as follows:

1. A rear vision mirror structure comprising, an elastomeric casing member including a base and an upstanding peripheral flange therearound including a pair of parallelly disposed grooves extending peripherally in the walls thereof, a mirror held within the groove adjacent said base, a tab associated with said mirror and extending outwardly through the wall of said flange, a no-glare shield positioned in the other groove of said flange and held parallel and spaced from said mirror, an inwardly extending elastomeric projection in the wall of said flange adjacent said opening and normally between the mirror and the shield whereby the mirror may be tilted within the cavity by pressure applied to said tab sufficient to distort the projection to permit an edge of said mirror to pass thereover, and means for mounting the casing associated with the side of said casing opposite to the side carrying said flange.

2. A no-glare safety mirror comprising in combination, an elastomeric casing of resilient rubber-like material including a solid back and having an upstanding flange extending outwardly and peripherally thereof, a mirror held within said flange and entirely through the resilient action of said flange, said mirror being tiltable to one of two positions, a resilient detent of resilient rubber-like material integral with the casing and extending toward said mirror for holding the mirror in either of said tilted positions, and an actuating member attached to the mirror adjacent the detent and extending through the casing flange whereby the mirror may be operated to either of said two positions by manipulation of said mirror.

References Cited in the file of this patent

UNITED STATES PATENTS

| | | |
|---|---|---|
| 1,893,245 | Ritz-Woller | Jan. 3, 1933 |
| 1,919,475 | McKinley | July 25, 1933 |
| 2,000,212 | Bradley | May 7, 1935 |
| 2,420,259 | McNamara | May 6, 1947 |

FOREIGN PATENTS

| | | |
|---|---|---|
| 1,055,499 | France | Oct. 14, 1953 |
| 1,083,858 | France | June 30, 1954 |
| 947,136 | Germany | Aug. 9, 1956 |